United States Patent
Liu et al.

(10) Patent No.: US 10,134,110 B1
(45) Date of Patent: Nov. 20, 2018

(54) TEMPORAL STABILITY FOR SINGLE FRAME SUPER RESOLUTION

(71) Applicant: PIXELWORKS, INC., Portland, OR (US)

(72) Inventors: Guodong Liu, Shanghai (CN); Bob Zhang, Santa Clara, CA (US); Neil Woodall, Newport Beach, CA (US); Junhua Chen, Shanghai (CN); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 458 days.

(21) Appl. No.: 14/676,114

(22) Filed: Apr. 1, 2015

(51) Int. Cl.
| | |
|---|---|
| *H04N 19/00* | (2014.01) |
| *H04N 7/00* | (2011.01) |
| *G06T 3/00* | (2006.01) |
| *G06T 3/40* | (2006.01) |
| *G06T 5/00* | (2006.01) |
| *H04N 7/01* | (2006.01) |
| *H04N 19/132* | (2014.01) |
| *H04N 19/513* | (2014.01) |

(52) U.S. Cl.
CPC ............ *G06T 3/4069* (2013.01); *G06T 5/002* (2013.01); *H04N 7/014* (2013.01); *H04N 7/0147* (2013.01); *H04N 19/132* (2014.11); *H04N 19/521* (2014.11); *G06T 2207/20028* (2013.01)

(58) Field of Classification Search
CPC .................. G06T 3/4069; G06T 5/002; G06T 2207/20028
See application file for complete search history.

(56) References Cited

U.S. PATENT DOCUMENTS

| | | | | |
|---|---|---|---|---|
| 4,924,310 A * | 5/1990 | von Brandt | ........ | G06K 9/00335 375/240 |
| 5,777,682 A * | 7/1998 | De Haan | ................ | H04N 7/014 348/451 |
| 6,809,758 B1 * | 10/2004 | Jones | ...................... | H04N 5/145 348/208.99 |
| 7,480,334 B2 * | 1/2009 | Nair | .......................... | G06T 7/20 375/240.16 |
| 2011/0142289 A1 * | 6/2011 | Barenbrug | ................ | G06T 7/11 382/107 |

(Continued)

OTHER PUBLICATIONS

Y. Matsushita, E. Ofek, Weina Ge, Xiaoou Tang and Heung-Yeung Shum, "Full-frame video stabilization with motion inpainting," in IEEE Transactions on Pattern Analysis and Machine Intelligence, vol. 28, No. 7, pp. 1150-1163, Jul. 2006. doi: 10.1109/TPAMI.2006.141.*

(Continued)

*Primary Examiner* — Utpal Shah
(74) *Attorney, Agent, or Firm* — Miller Nash Graham & Dunn LLP

(57) ABSTRACT

A method includes receiving, at a processor, a frame of input image data, generating at least one motion vector field between a first frame of input image data and an adjacent frame of input image data, refining the at least one motion vector field to provide refined motion vectors, temporally filtering a frame of input image data to produce a temporally filtered frame of image data, and generating a frame of interpolated image data using the temporally filtered frame of image data and the refined motion vectors.

14 Claims, 21 Drawing Sheets

(56) References Cited

U.S. PATENT DOCUMENTS

| | | | |
|---|---|---|---|
| 2011/0229029 A1* | 9/2011 | Kass | G06T 5/002 |
| | | | 382/168 |
| 2012/0014616 A1* | 1/2012 | Lee | H04N 19/33 |
| | | | 382/255 |
| 2012/0218473 A1* | 8/2012 | Xu | G06T 3/4053 |
| | | | 348/699 |
| 2014/0286593 A1* | 9/2014 | Numata | G06T 5/002 |
| | | | 382/275 |
| 2014/0327820 A1* | 11/2014 | Iketani | H04N 7/012 |
| | | | 348/452 |

OTHER PUBLICATIONS

Wang, Ci, Lei Zhang, Yuwen He, and Yap-Peng Tan. "Frame rate up—conversion using trilateral filtering." IEEE Transactions on Circuits and Systems for Video Technology 20, No. 6 (2010): 886-893.*

* cited by examiner

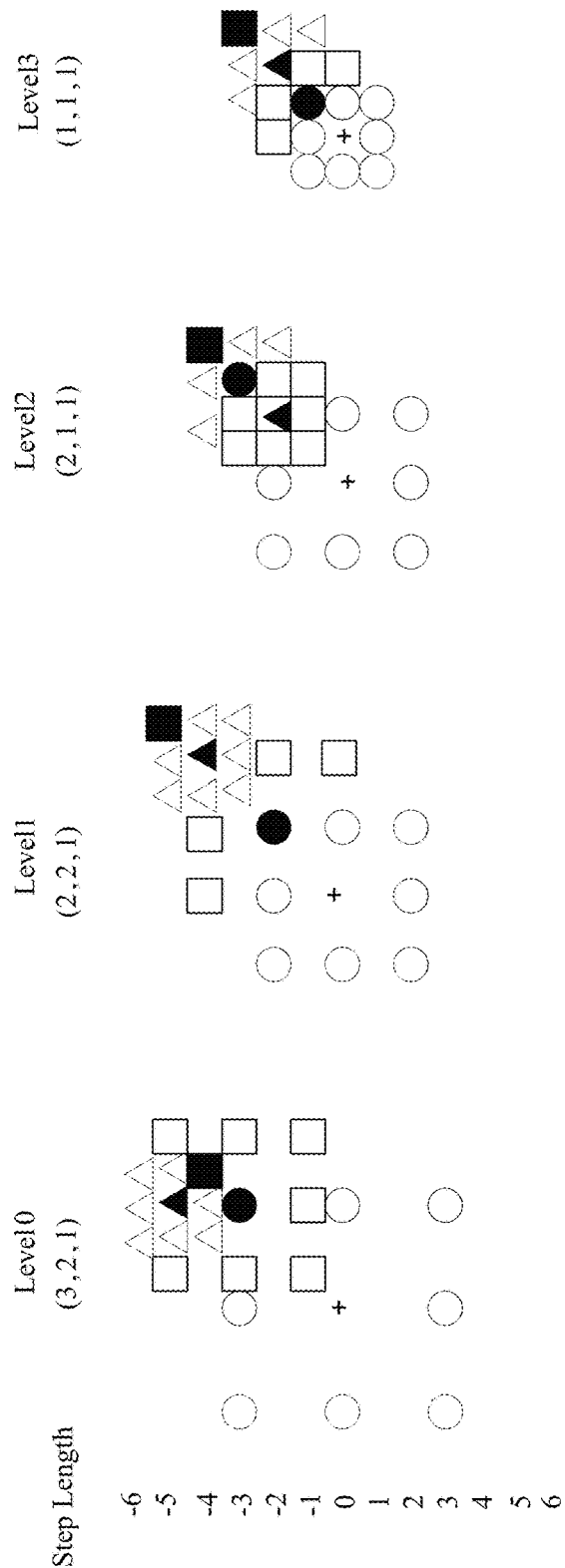

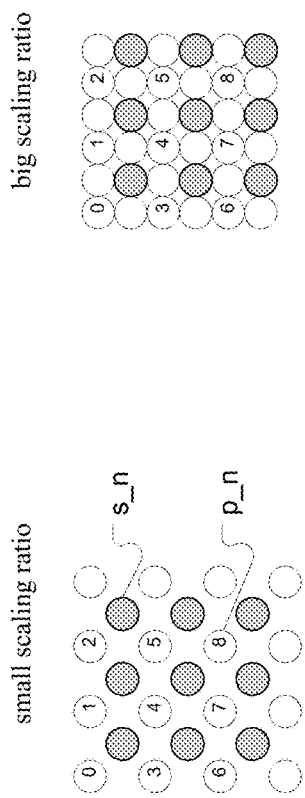
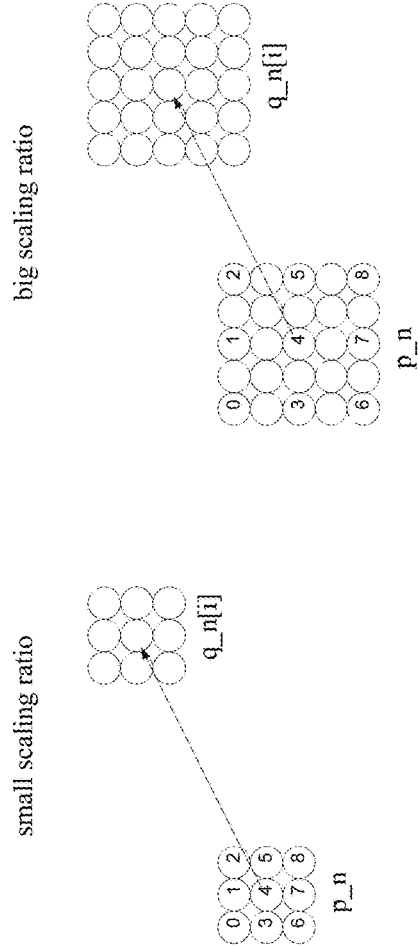
FIGURE 22
FIGURE 23

TEMPORAL STABILITY FOR SINGLE FRAME SUPER RESOLUTION

BACKGROUND

The resolution of display devices continues to increase. For example 3840×2160 panels have become more prevalent on the market. However, almost all video sources have resolutions lower than this. The higher resolution panels typically include some form of super resolution or upscaling to convert the image/video source from low resolution to high resolution in order to match the device's resolution.

For example, super resolution techniques generate higher resolution frames from lower resolution frames. Single frame super resolution (SFSR) can recover details and preserve sharp edges with relatively low computation cost when compared with multi-frame super resolution techniques. Another example includes less complex methods of upscaling to the higher resolution. However, the upscaled image results often look less stable in the temporal domain and have more noise than the input low resolution images. These are just examples of images that may have temporal instabilities. Other types of image data may have temporal instabilities, such as decompressed image data.

The cause of the instability and the more obvious noise results from using information from a single image or an external training library instead of information from multiple frames in the temporal domain. Because of this, the above methods cannot distinguish noise from details. Therefore, if the input source has some noise, the output looks more annoying in the temporal domain during playback.

Upscaling or super resolution techniques sometimes produce artifacts because these algorithms do not have enough information to always correctly reconstruct the missing detail, resulting in a wrong or unstable operation in the processes. The artifacts change from frame-to-frame causing instability in the temporal domain. Because these techniques generally produce an enhanced image, even a slight discrepancy in texture regions among adjacent input frames will bring even more inconsistency in the temporal domains after upscaling and/or frame rate conversion.

BRIEF DESCRIPTION OF THE DRAWINGS

FIG. 6 shows examples of search cases for different groups in a fast search process.

FIG. 22 shows the relationship between a pixel neighborhood and its shift version.

FIG. 23 shows examples of corresponding pixel neighborhoods with different scaling ratio.

DETAILED DESCRIPTION OF THE EMBODIMENTS

Many different types of image data may have temporal instabilities. The following discussion will focus on super resolution as a source of image data having temporal instabilities. This is just for ease of understanding but the techniques and embodiments discussed below apply to any input image data that has temporal instabilities.

Figure 1:
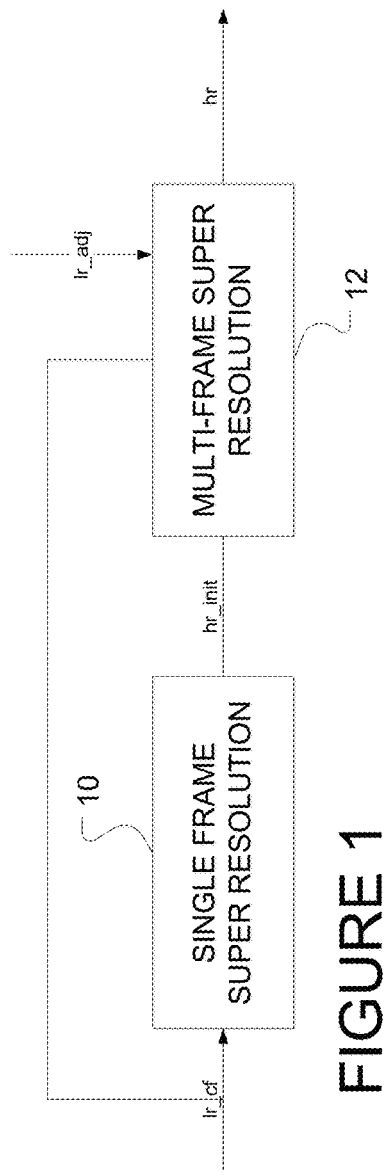
FIG. 1 shows an embodiment of a process to generate high resolution image data from low resolution image data by implementing single frame super-resolution and multi-frame super-resolution.

FIG. 1 shows an example of a super resolution process using single frame super resolution combined with multi-frame super resolution. By using the single frame super resolution to generate an initial high resolution image as the initial high resolution frame, the multi-frame super resolution process produces an image with outstanding picture quality. An example of this process is shown in FIG. 1, where an initial single frame super resolution process 10 acts upon a low resolution current frame lr_cf to generate an initial high resolution hr_init that is then used in the multi-frame super resolution process 12 that generates a high resolution image hr. However, this process uses at least five low-resolution frames and motion vectors to fuse the images together in order to achieve good quality.

Figure 2:
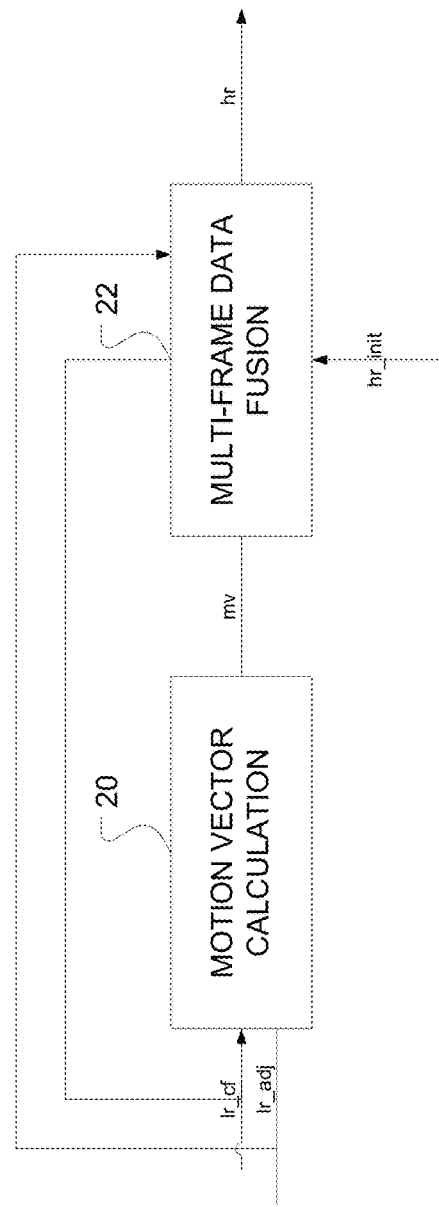
FIG. 2 shows an embodiment of a process of multi-frame super-resolution.

FIG. 2 shows an example of motion vector calculations within a multi-frame data fusion. The low resolution current field lr_cr and four different fields fused together as lr_adj to achieve good quality at a motion vector calculation 20. The generated motion vectors mv, the initial lr_cf and the initial high resolution frame from the single frame super resolution process, hr_init may be used in a multi-frame data fusion process 22 to produce the high resolution final image data hr. This process results in a very high cost.

In addition to panels requiring higher resolution than the native format of the video source, a need often exists for a faster frame, or refresh rate. For example, current generation display panels can have a refresh rate as high as 240 frames per second, while the video source may only use 60 frames per second. The process of converting from a native video source's frame rate to a higher or lower frame rate is typically called frame rate conversion. Display manufacturers have found that merely repeating frames does not lead to high quality video streams and so perform what is called frame interpolation.

Frame rate interpolation generates frames in between the frames of the current video stream using the data of the two frames, and possibly other frames adjacent in time to the two frames. This process 'manufactures' pixel data for pixels in the new frame of data. In order to account for motion between the two frames, the process often performs motion estimation and motion compensation (MEMC). As part of this process, motion vectors between the two frames are calculated. Motion vectors are typically calculated for a group of pixels that correspond to a location in the interpolated frame. The temporal offset of the output relative to the input frame before it is referred to as a phase. For example, phase 0 has a temporal location equal to the previous frame, phase 1 has a temporal location equal to the current frame and phase 0.5 is a frame half way in between the two. Combining the super resolution discussed above and frame rate conversion, the process can obtain some of the benefits of using multi-frame super resolution and result in better image quality.

Figure 3:
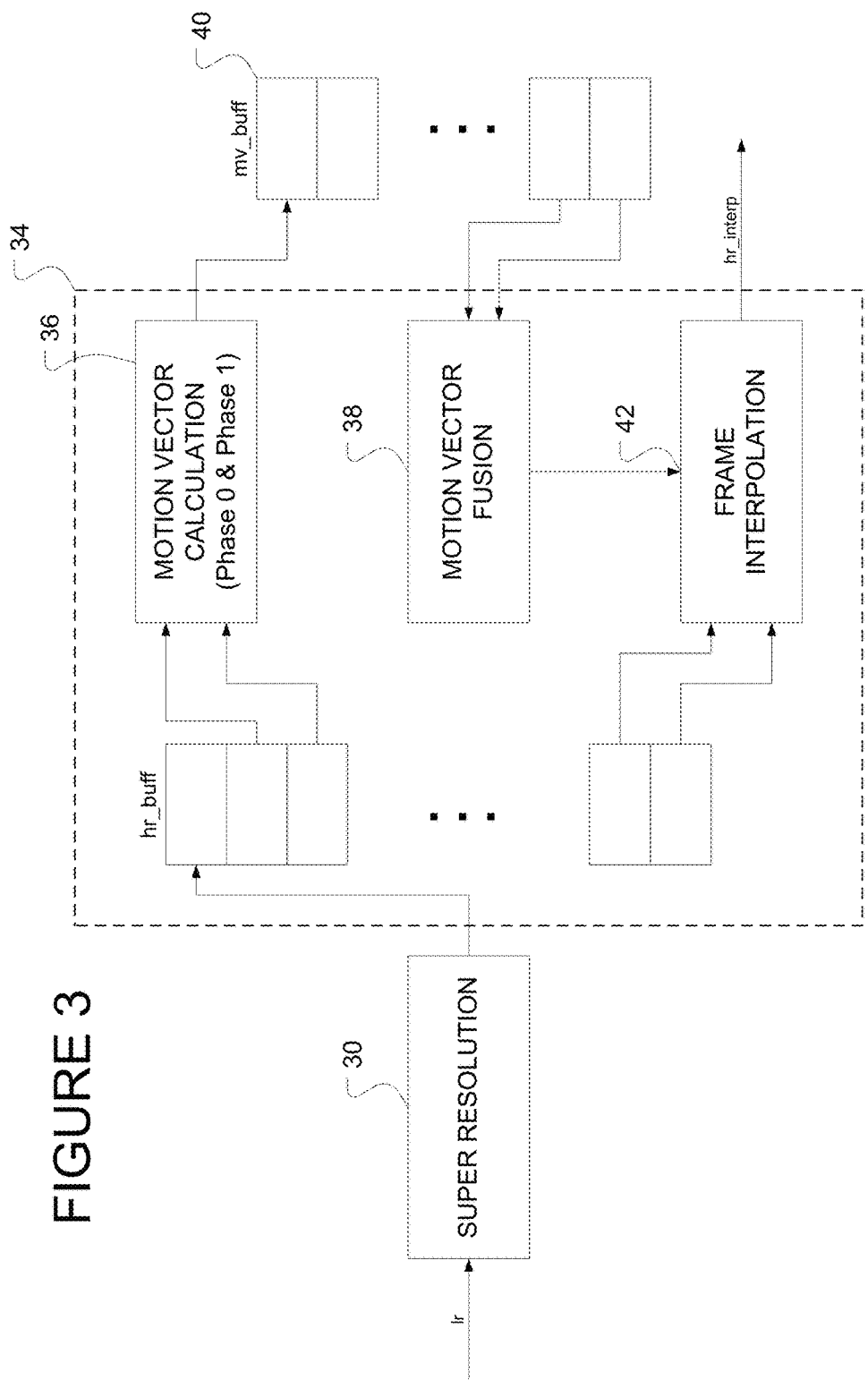
FIG. 3 shows an embodiment of a method of combining super resolution and frame rate conversion to generate high resolution image data.

FIG. 3 shows an embodiment of a combination of super resolution and frame rate conversion. At 30, the process performs super resolution. The process may use single frame super resolution, multi-frame super resolution, or a combination of both. However, using single frame super resolution provides the advantages of reduced costs and complexity that multi-frame resolution techniques do not. The single frame super resolution process 30 results in several high resolution frames of image data stored in the buffer hr_buff 32. These frames then undergo motion vector calculation using phase 0 and phase 1 at 36, within the frame interpolation process 34. As stated above, the super resolution process provides one example of a process that produces image data having temporal instabilities.

The motion vectors resulting from the motion vector calculation process are stored in the buffer mv_buff 40. These are then used to generate the motion vector fields for the interpolated frames at 38. The frame interpolation module 42 then takes the frames of data between which the new frame will reside from the high resolution buffer, applies the motion vectors and produces an interpolated frame of high resolution data hr_interp.

The motion vectors developed in the process do not have quite as high of accuracy as those resulting from the multi-frame super resolution process, but can undergo a refining process that causes them to have almost the same accuracy as the multi-frame super resolution process.

Figure 4:
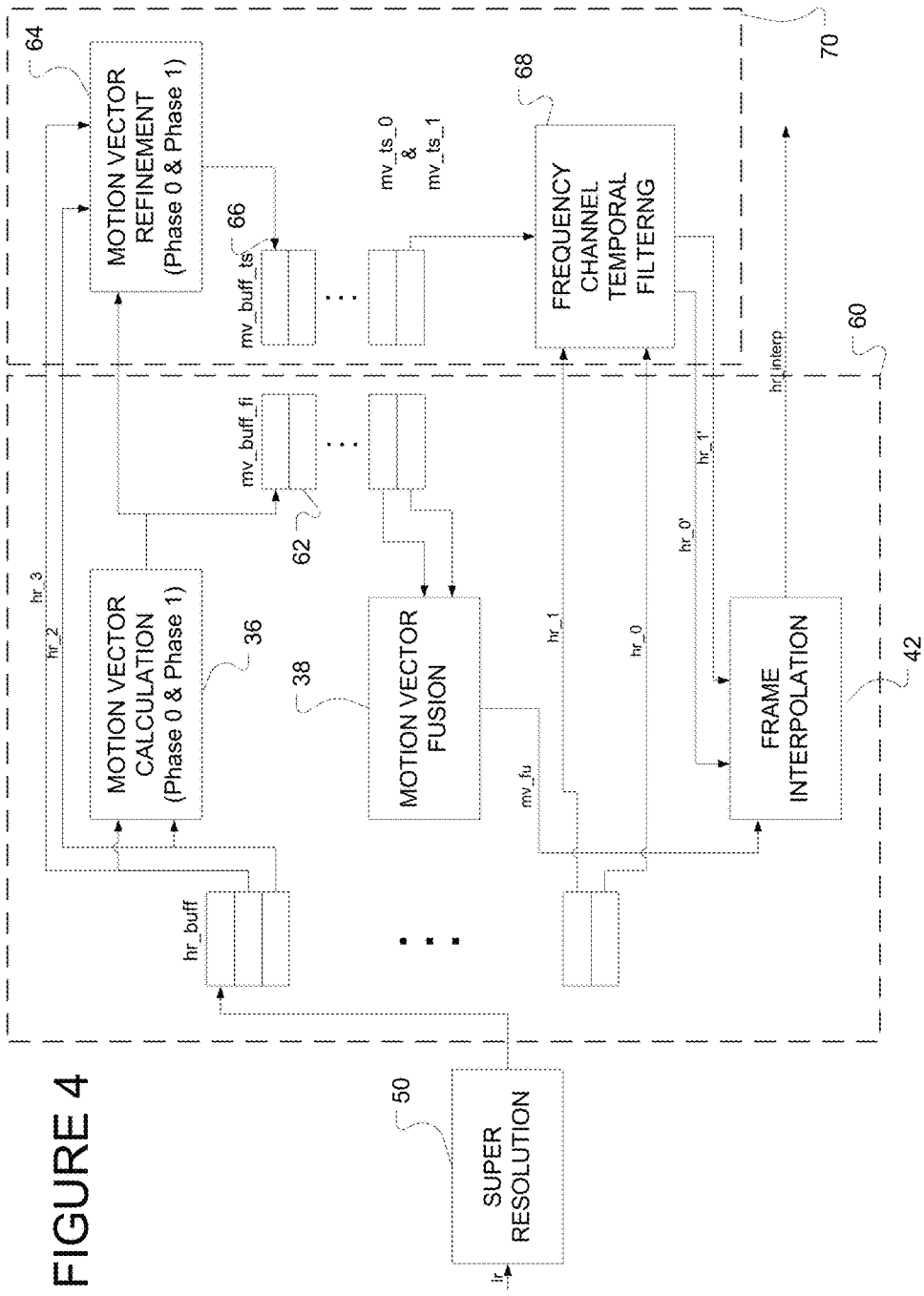
FIG. 4 shows an embodiment of a framework for combining super-resolution and frame rate conversion with temporal stability preservation.

FIG. 4 shows a flowchart of an embodiment of combined single frame super resolution and frame rate conversion with embedded temporal stability preservation. The process takes an initial low resolution image and upscales it to a high resolution image by single frame super resolution at 50, resulting in input image data to the frame interpolation process. Again, the input image data may result from a super resolution process or any process that results in data having temporal instabilities. The frame interpolation process 60 performs motion vector calculation 36 at phase 0 and phase 1. In one embodiment, the process uses four frames of high resolution image data, hr_0, hr_1, hr_2, and hr_3, with hr_3 being the newest one. In terms of the process, hr_3 is the current frame (CF), and hr_2 is the previous frame (PF).

In this particular embodiment, motion vector calculation and motion vector refinement occur prior to the frame interpolation and frequency channel temporal filtering. Motion vector calculation 36 and refinement 64 uses hr_2 and hr_3 frames while frequency channel temporal filtering occurs on the hr_0 and hr_1. One should note that the while this embodiment uses these four frames, one could use as few as two frames. The results of the motion vector calculation 36 are stored in the motion vector buffer for frame interpolation 62, mv_buff_fi, and also undergo motion vector refinement at 64. The motion vector fusion module 38 takes the motion vectors from the buffer 62 and generate motion vector field for interpolation phase. It then provides the fused motion vectors mv_fu to the frame interpolation module 42.

Meanwhile, the motion vector refinement module 64 refines the motion vectors, producing refined motion vectors and stores them in the buffer mv_buff_ts 66. Embodiments of motion vector refinement will be discussed in more detail later. The frequency channel temporal filtering module 68 takes the motion vectors from the buffer, the frames hr_0, and hr_1, and produces temporally filtered frames hr_0' and hr_1'. These temporally filtered frames and the fused motion vectors are then used by the frame interpolation module 42 to produce the high resolution interpolated frame, hr_interp.

As will be discussed in more detail later, the temporal filtering may be performed in many ways. In FIG. 4, the temporal filtering may be accomplished using a finite impulse response (FIR) filter. Hr_0' is generated by temporally filtering hr_0 using hr_1 and mv_ts_0. Hr_1' is generated by temporally filtering hr_1 using hr_0 and mv_ts_1. In this embodiment, the temporal filtering is performed inline with the frame interpolation process so the motion vector fields are not written back to the buffer, In an alternative embodiment, an infinite impulse response filter (IIR) is employed instead of an FIR. In this embodiment, hr_0' is retrieved from the buffer because it has already been generated during the previous frame. Hr_1' is generated by filtering hr_1 using hr_0' and mv_ts_1 and then hr_1' is written into the frame buffer to overwrite hr_1 while also being used for frame interpolation. In this case temporal filtering may only be required to be done at phase 1. The performance of the IIR mode is more aggressive and better than FIR mode and requires less logic. However, the IIR mode requires more bandwidth than the FIR mode.

As mentioned above, the motion vectors generated by the motion vector calculation module 36 are refined by the motion vector refinement module 64. The motion refinement module provides accurate motion vectors. Accurate motion vectors are important in generating fused images that have good detail and low distortion. The frame rate conversion process provides almost true motion vectors, close to the best motion vector in view of the error/accuracy measurements or correlation. For example, accuracy measurements may include the sum of absolute differences (SAD) as a measure of how close the motion vectors are to true motion vectors. The motion vectors derived from the frame rate conversion process can undergo refinement to provide better motion vectors for temporal filtering.

Figure 5:
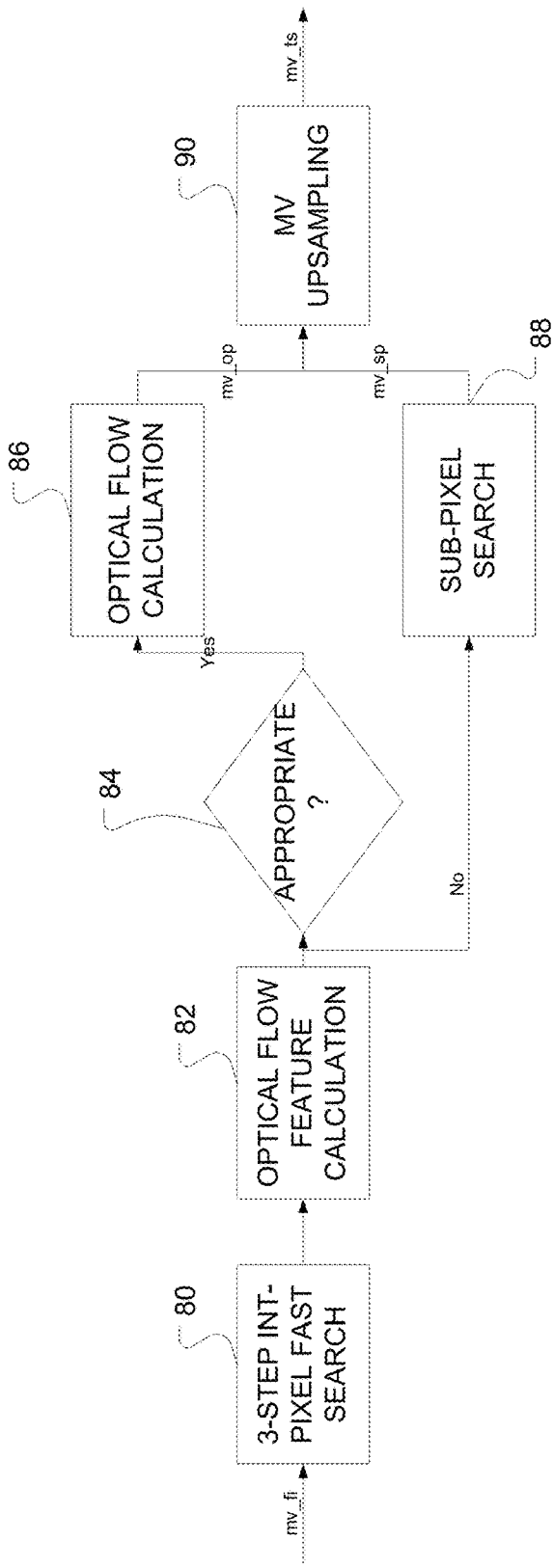
FIG. 5 shows an embodiment of an optical flow method to refine motion vectors.

The refinement method is the same for phase 0 and phase 1, therefore only phase 1 is described. FIG. 5 shows a flowchart of an embodiment of performing motion vector refinement. Motion vector calculation and refinement may work with the original high resolution images or their ½ downsampled versions. For very high resolution images, such as 4K×2K, it is better to use ½ downsampled version of the high resolution images. As shown in FIG. 6, the process begins with a fast search at 80. The process then checks the optical flow features at 82. If this process is appropriate as determined at 84, the optical flow calculations are performed at 86 using optical flow based motion vectors. If the process is determined to be inappropriate, the sub-pixel motion vectors are calculated by full sub-pixel search. Finally, motion vectors are generated for smaller blocks by upsampling the larger block motion vectors. In this embodiment, the smaller blocks are 4×4 and the larger blocks are 8×8.

Figure 8:
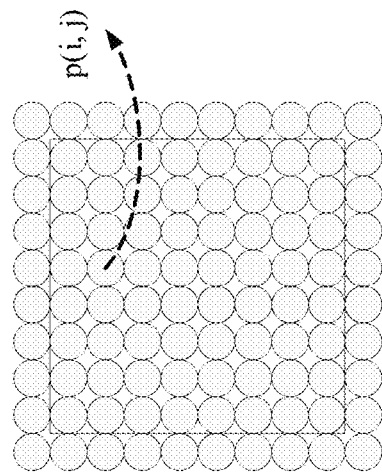
FIG. 8 shows a block with 1-pixel extension towards the boundaries.
Figure 7:
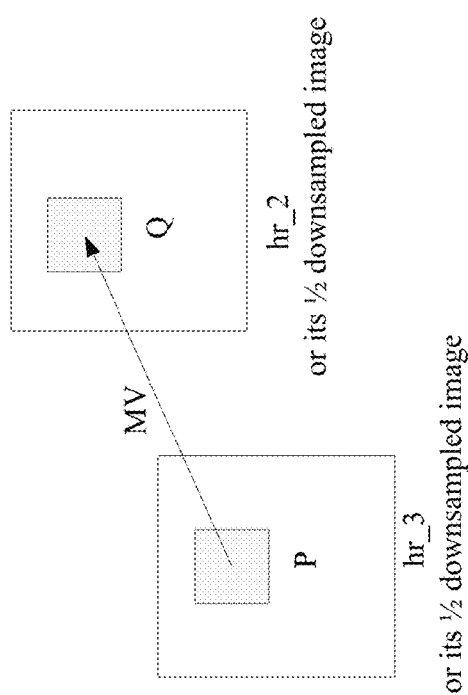
FIG. 7 shows a most matched block process.

The discussion will now take each of these processes in more detail. The motion vector magnitude often influences its accuracy and precision. It is better to use different step lengths for different motion vector magnitudes and different iterations. The step length in the x and y directions are adaptively decided by the initial motion vector magnitude in each direction respectively. For many situations, the motion vector magnitude in each direction can be divided into 4 levels, each larger than the next. Then for each direction, the step lengths in pixels may be decided as:

If motion vector magnitude belongs to the level 3 group, the step lengths are (3, 2, 1);

If motion vector magnitude belongs to the level 2 group, the step lengths are (2, 2, 1);

If motion vector magnitude belongs to the level 1 group, the step lengths are (2, 1, 1);

If motion vector magnitude belongs to the level 0 group, the step lengths are (1, 1, 1). FIG. 6 shows examples of these search groups. In FIGS. 6 and 8, the '+' symbol represents an initial motion vector. Empty or open circles represent motion vectors tested for the first step, while closed circles represent the best vector for the first step. Open squares represent motion vectors to test for the second step, and the closed or filled square represents the best motion vectors for second step. Empty triangles represent motion vectors to test for the third step, and the filled triangles represent the motion vector that was the best motion vector from the third step.

As mentioned above, the optical flow method provides a good tool to find accurate sub-pixel motion vectors, but it is unsuitable to calculate motion vectors in some cases. For example, smooth regions or regions where there is an aperture problem, that is, the motion vector cannot be uniquely determined through a small window or aperture, are unsuitable for optical flow. It is also unsuitable for image boundary regions or when the motion vectors points outside of the image. Furthermore, it also requires a good initialization. The motion vectors from the 3 step search above provide a good initialization.

For an 8×8 block P in hr_3, or its downsampled image, the process searches for its best matched block Q in hr_2, or its downsampled image. FIG. 8 shows the pixel p(i, j) in block P with 1 pixel extension towards boundary. The optical flow statistic or feature matrix for P as follows:

$$p_x(i, j) = (p(i+1, j) - p(i-1, j))/2$$

$$p_y(i, j) = (p(i, j+1) - p(i, j-1))/2$$

$$M = \begin{pmatrix} \sum_{\substack{0 \le i \le 7 \\ 0 \le j \le 7}} p_x(i,j) * p_x(i,j) & \sum_{\substack{0 \le i \le 7 \\ 0 \le j \le 7}} p_x(i,j) * p_y(i,j) \\ \sum_{\substack{0 \le i \le 7 \\ 0 \le j \le 7}} p_y(i,j) * p_x(i,j) & \sum_{\substack{0 \le i \le 7 \\ 0 \le j \le 7}} p_y(i,j) * p_y(i,j) \end{pmatrix} = \begin{pmatrix} a & b \\ b & c \end{pmatrix}$$

M is the feature matrix. Its eigenvalues are $$\lambda_0 = ((a+c) + \sqrt{(a+c)^2 - 4(ac - b^2)^2})/2$$

$$\lambda_1 = ((a|c) + \sqrt{(a|c)^2 4(acb^2)^2})/2.$$

If one of eigenvalues is very small or the ratio between max and min eigenvalues is very big, the region may be a smooth or aperture region. Therefore, it can't use optical flow algorithm to refine MV.

Usually, the optical flow method can find a more precise sub-pixel MV than traditional 8-neighborhood sub-pixel search. The typical optical flow method requires multiple iterations to converge unless the initial MV is close. By using the MV from int-pixel fast search as the initial MV, only 2 iterations are required for good results.

The process may occur as follows. First the process initializes MV=(x,y), from the 3-step int-pixel fast search discussed above. The process calculates the block Q of FIG. 8 pointed to by the motion vector MV. It calculates the block difference between P and Q, D=P−Q. The process then determines:

$$e = \sum_{\substack{0 \le i \le 7 \\ 0 \le j \le 7}} p_x(i,j) * d(i,j), \quad f = \sum_{\substack{0 \le i \le 7 \\ 0 \le j \le 7}} p_y(i,j) * d(i,j).$$

It then solves for the change (delta) motion (dx, dy) by:

$$\begin{pmatrix} dx \\ dy \end{pmatrix} = \begin{pmatrix} a & b \\ b & c \end{pmatrix}^{-1} \begin{pmatrix} e \\ f \end{pmatrix},$$

and updates MV as MV+=(dx, dy). This process is then repeated one more time unless dx and dy equal zero, or dx or dy is larger than ¼ the block size. In the later case, using optical flow is not appropriate.

Figure 10:
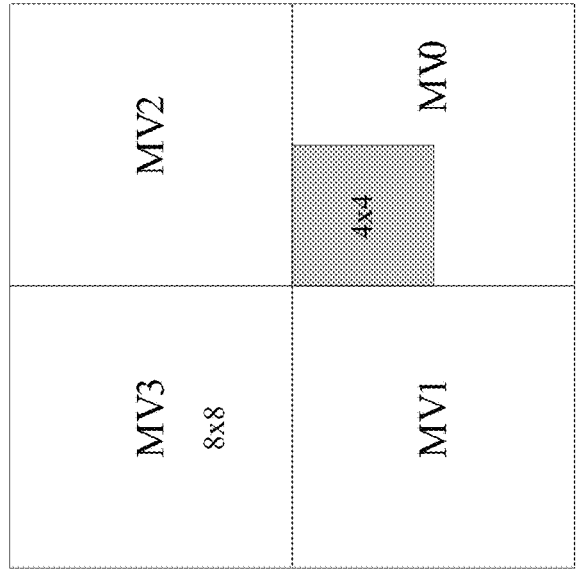
FIG. 10 shows an embodiment of a central 4×4 block data with four nearest 8×8 blocks.
Figure 9:
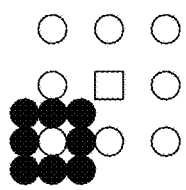
FIG. 9 shows results of sub-pixel searches.

As discussed above, the optical flow model may not be appropriate depending upon the nature of the region. In this instance, one may use a sub-pixel search. FIG. 10 shows this graphically. The process starts by performing a ½ pixel search based upon some sort of difference measurement. In one embodiment it uses SAD. The pixel identified from this search is shown in FIG. 9 as the upper left pixel of 3×3 neighborhood of ½ pixels. The process then performs an 8-neighborhood ¼ pixel search also based on the difference measurement. This pixel lies in the upper left pixel of 3×3 neighborhood of ¼ pixels of FIG. 9. The solid colored pixel is the resulting pixel from the int-pixel search.

Referring back to FIG. 5, the process then performs motion vector upsampling at 90. FIG. 10 shows a graphical representation of this process. The motion vectors in the process of FIG. 5 up to this point were calculated for each 8×8 block of image data. In order to get more accurate motion vectors, the motion vectors can be calculated for smaller blocks, such as 4×4. For each 4×4 block, the process uses motion vectors of the four nearest 8×8 blocks as candidates. A difference measurement, such as SAD, is calculated using 8×8 data surrounding the current 4×4 block. The process then selects the motion vector with the minimal difference measurement as the optimal motion vector. For the optimal MV, a SAD by using its central 4×4 block data, named SAD4×4, is calculated in order to do noise statistics. A measurement NP which is used to evaluate how many texture, edges or details are in current block. It is calculated as follows:

$$p_x(i, j) = \min(\text{abs}(p(i+1, j) - p(i, j)), RobustNPThr)$$
$$p_y(i, j) = \min(\text{abs}(p(i, j+1) - p(i, j)), RobustNPThr)$$
$$NP = \max\left(\sum_{\substack{0 \le i \le 7 \\ 0 \le j \le 7}} p_x(i, j), \sum_{\substack{0 \le i \le 7 \\ 0 \le j \le 7}} p_y(i, j)\right).$$

NP represents neighboring pixel and is a measurement of the amount of texture in the block. In sub-pixel motion in areas with a lot of texture, one ends up with a larger SAD value because of sampling effects. Even if the motion vector is perfect, one gets a large SAD value. For example, in the input was 1, 0, 1, 0, 1, 0 and the next frame moved by ½ pixels, the perfect motion vector would point to a region of ½, ½, ½, ½, ½, ½. By calculating a value that represents how big this effect could be, one can adjust the SAD. In this manner, the SAD value correlates more strongly with the actual motion vector error magnitude. Further measurements are also gathered. Another measurement, motion vector confidence can be determined by the MVErr. The motion vector confidence is used to evaluate the confidence in the motion vector, that is, it is a measure of the motion vector accuracy.

Figure 11:
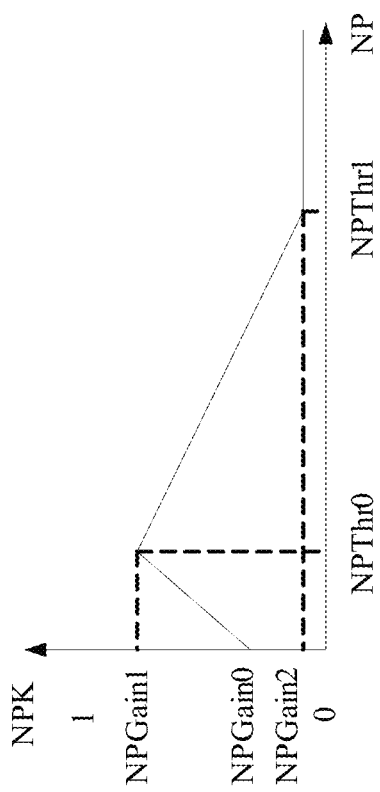
FIG. 11 shows a graphical representation of an adaptive parameter calculated related to a nearest pixel.

The SAD is adjusted by NP in order to reduce the impact of sampling effects caused high frequency content. If the adjusted SAD is big, small confidence is given to the current motion vector. In smooth or weak texture regions, only give big confidence measures to the motion vector whose SAD is much smaller than NP multiplied by a gain. It is calculated by SADMnsNP=SAD−min(NPK*NP, NPAdjThr);

MVErr=min(max(SADMnsNP−SADNPCoring,
0)/max(min(NPAdjK*NP, SADNPMaxThr), 1),
1);

Here, NPAdjThr, SADNPCoring, NPAdjK and SAD-NPMaxThr are parameters. NPK is an adaptive parameter calculated based on NP, shown in FIG. 11.

Another issue that arises with regard to the upsampling, is that noise severely influences the performance of upscaling/super-resolution. It is necessary to generate a noise statistic in order to remove the noise component while minimizing the impact to details. Because the noise statistic is done on the full or reduced resolution version of upscaling/super-resolution images, the noise includes contributions from single frame super resolution instability, sampling jitter/error and additive random noise.

For each block, the SAD of the optimal motion vector is impacted by the noise level. Moreover, different NP levels often leads to different SAD levels. The bigger the NP is the bigger the SAD is for a given motion vector error size. For big NP, SAD includes some sampling error and match error in addition the random noise component.

The process wants to classify the amount of noise by the size of the possible errors, associated not just with the random noise, but temporal instabilities. This allows a decision as to how aggressive the temporal filtering should be. If it is too aggressive, the wrong motion vector will cause artifacts, but not aggressive enough will result in temporal instabilities. Therefore, the noise level is calculated according to different NP levels. In one embodiment, the process classifies the current block into different classes based upon the NP. In one embodiment, there are 7 classes.

Figure 12:
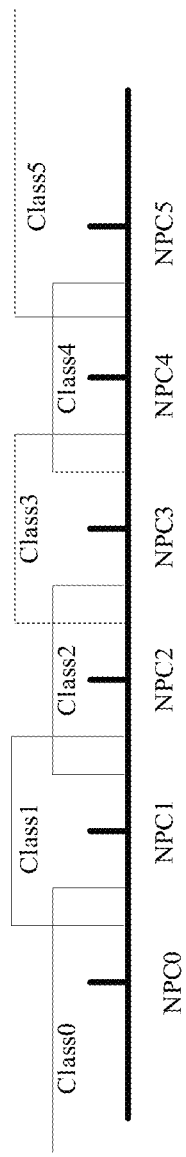
FIG. 12 shows a graphical representation of various classes.

If NP<NPC0 or abs(NP−NPC0)<NPDist, current block belongs to class 0;

If abs(NP-NPCc)<NPDist, current block belongs to class c (1<c<5);

If abs(NP-NPC5)<NPDist or NP>NPC5, current block belongs to class 5;

The class 6 is population of samples, so current block always belong to class 6. FIG. 12 shows a graphical representation.

The classification process may begin with a proposed classification of a block in class c. The process then determines whether that current block is well matched or not is checked by comparing the SAD with min(SADNPK[c]*NP+SADNPComp, SADThr). If the SAD is smaller than the latter value, the current block is well matched. In this instance, SADThr and SADNPComp are parameters. The parameter SADNPK is set for each class. The smaller the NP of a class is, the bigger the SADNPK of this class is. If the current block is well matched, the sum of 4×4 SADs of well-matched blocks in class c SADSum[c] is updated by adding current SAD4×4 to it, that is SADSum[c]+=SAD4×4 and the count of well-matched blocks in class c BlkCount[c] is updated by adding 1 to it, BlkCount[c]+=1.

After the process has refined the MVs for the whole frame, then the noise level of class c for that frame is calculated according to the following formula:

nNoiseLev[c]=(
√π/2)*(SADSum[c]/(BlkCount[c]*16))

For one class, if the number of effective samples, BlkCount [c], is very small, its noise level can't be reliably estimated by its statistics. Therefore its value should be interpolated as follows:

if its nearest 2 classes (one has bigger NP, other has smaller NP) have enough samples, its noise level is linearly interpolated by their noise levels according to class index distance;

else if there is only one nearest effective class, its noise level equal to this one; else if population of samples has effective noise level, its noise level equal to this one;

else, its noise level is equal to 0.

Averaging or temporal filtering the results over several frames can further refine the noise level. Temporal filtering may or may not be performed. It may not be necessary because the sample is often big enough. However, given that the cost for temporal filtering is relatively low and that it will give more stable results, it is usually used.

Each original high-resolution image from super-resolution block is filtered by using 2 high resolution images and the corresponding MVs between them in order to preserve temporal stability. As mentioned before, the filtering for hr_0 and hr_1 are the same excluding the input MVs and the filtering in FIR and IIR modes are the same excluding whether the previous frame is already filtered.

Figure 13:
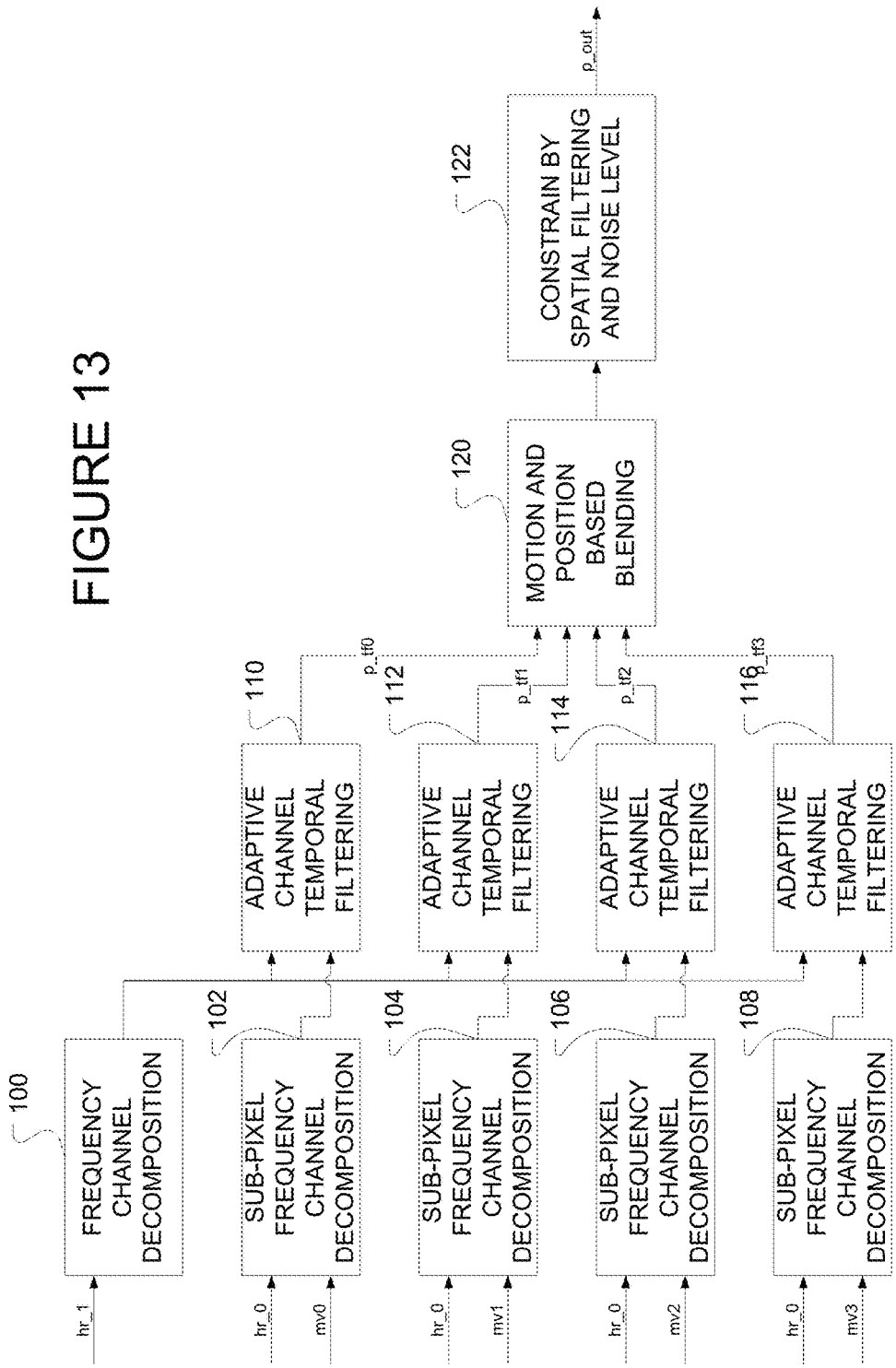
FIG. 13 shows an embodiment of a process for frequency channel temporal filtering.

From many experiments and analysis, it is found that temporal instability in different frequency channels should be dealt with differently. Commonly, the instability in the high frequency channel looks like noise or small-magnitude flicker, which should be removed aggressively. The temporal instability in low frequency channel should be removed according to texture/edge strength of pixel neighborhood in order to avoid floating, distortions or blurring. FIG. 13 shows a flowchart of an embodiment of a frequency channel decomposition process.

FIG. 13 shows an embodiment of a FIR mode using hr_0. For IIR the image hr_0' is used instead. In one embodiment, only the luma (Y) components are filtered to save cost. The motion vector from the motion vector refinement is calculated for each 4×4 block in the original high resolution or its ½ down-sampled version. The block size BLKSIZE in the high resolution image may be 4×4 and 8×8.

In overview, for a pixel p in hr_1, the process selects motion vectors from 4 nearest block in the high resolution image according to pixel p's position, then calculate the corresponding pixel in hr_0 for each motion vector, then does frequency channel decomposition for current pixel and all corresponding pixels. The pixel and the corresponding pixels undergo adaptive channel temporal filtering. The process then fuses the filtered results based on the 4 motion vectors according to pixel motion error and pixel position. The temporal filter strength is further constrained by using spatial filtering and noise level. This embodiment will be discussed in more detail further.

Figure 14:
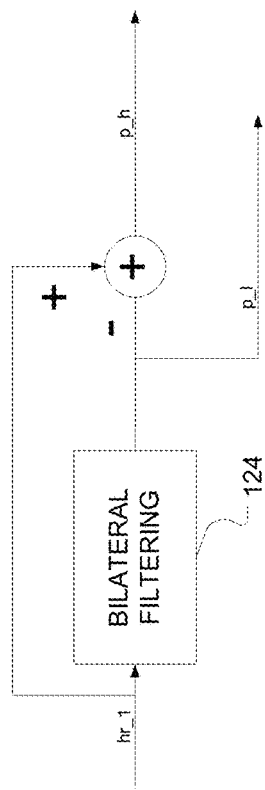
FIG. 14 shows an embodiment of frequency channel decomposition process by using a bilateral filtering.

For a pixel p in hr_1, it is decomposed into 2 frequency channels, low and high at 100. The low frequency part is generated by bilateral filtering 124 as shown in FIG. 14. The high frequency part is p minus its low frequency. Because bilateral filtering can preserve strong edges, the high frequency part should consist mostly of random details, weak edges, textures, and noise. Aggressive temporal filtering can be used for the high frequency part without fear of blurring the edges of objects.

Figure 15:
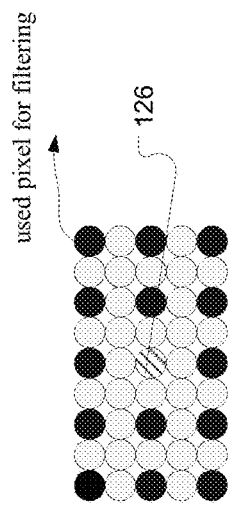
FIG. 15 shows a diagram of a pixel window used for bilateral filtering.

In one embodiment, bilateral filtering is done in a 3×5 window of the current pixel 126 as shown in FIG. 15. For upscale ratios larger than 3, better results are obtained by using a larger window. Because it is unlikely that the up scaling process is creating any detail close to the Nyquist frequency, a 3×5 window with 2-pixel spacing is used to reduce cost.

The weight of bilateral filtering is simply based on spatial distance and pixel difference with some adjustments. The weight about spatial distance is calculated as $n\text{WgtSpat}=\exp(-(j_p-j_s)^2/\mu^2).$ The s is a pixel in the neighborhood of p. The $j_p$ and $j_s$ are coordinates of p and s respectively. The weight about pixel difference is calculated as $\text{pix\_diff}=\max(\text{abs}(p-s)-\text{LumaDiffCoring}, 0);$ $n\text{WgtLuma}=\exp(-\text{pix\_diff}^2/\rho^2).$ LumaDiffCoring is a parameter to adjust pixel difference.

Figure 16:
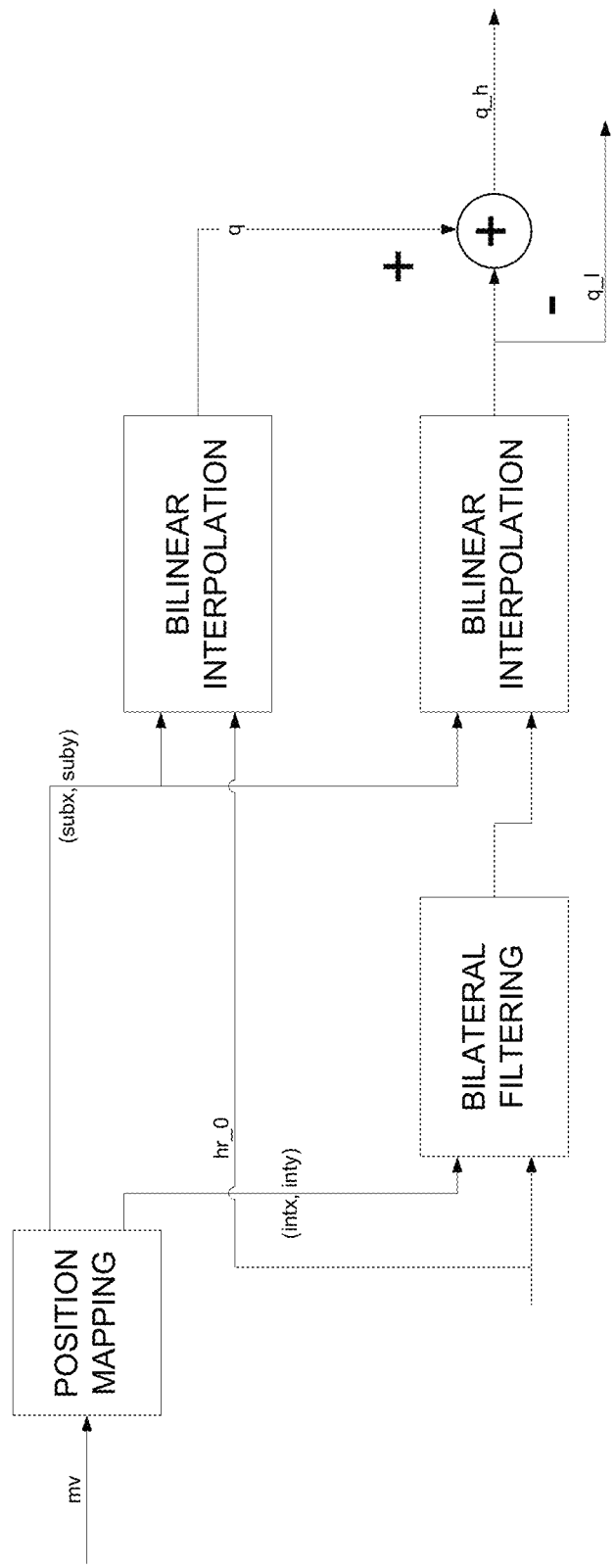
FIG. 16 shows an embodiment of sub-pixel frequency channel decomposition.

Referring back to FIG. 13, sub-pixel frequency channel decomposition is done at 102, 104, 106 and 108 respectively. For the pixel p, one motion vector points it to a pixel q at a sub-pixel position in image hr_0 for FIR mode or image hr_0' for IIR mode. The pixel q is calculated by bilinear interpolation of 4 nearest int-pixels. These 4 nearest int-pixels also have a corresponding 4 pixels that have been processed by the bilateral filtering. The low frequency part of q is generated by bilinear interpolation of these four filtered int-pixels. The high frequency part of q is q minus its low frequency part. This is shown in more detail in FIG. 16.

Referring back to FIG. 13, adaptive channel temporal filtering is used for each mv[i], i=0~3 at 110, 112, 114 and 116. For an input pixel p in hr_1, its high and low frequency parts are p_h and p_l respectively. Assume the current motion vector is mv[i]. The corresponding pixel in hr_0 pointed by mv[i] is q[i], and its high and low frequency parts are q_h[i] and q_l[i] respectively. In order to make the process more stable, 3×3 window of p, p_h, p_l, q[i], q_h[i], q_l[i] are used. They are named p_n[j], p_h_n[j], p_l_n[j], q_n[i][j], q_h_n[i][j] and q_l_n[i][j] respectively, j=0, 1, . . . , 8. For upscale ratios larger than 3, better results are obtained by using a larger window. Therefore, in one embodiment a 3×3 window with 2-pixel spacing is used. The algorithm flow of adaptive channel temporal filtering is shown in FIG. 18.

Figure 18:
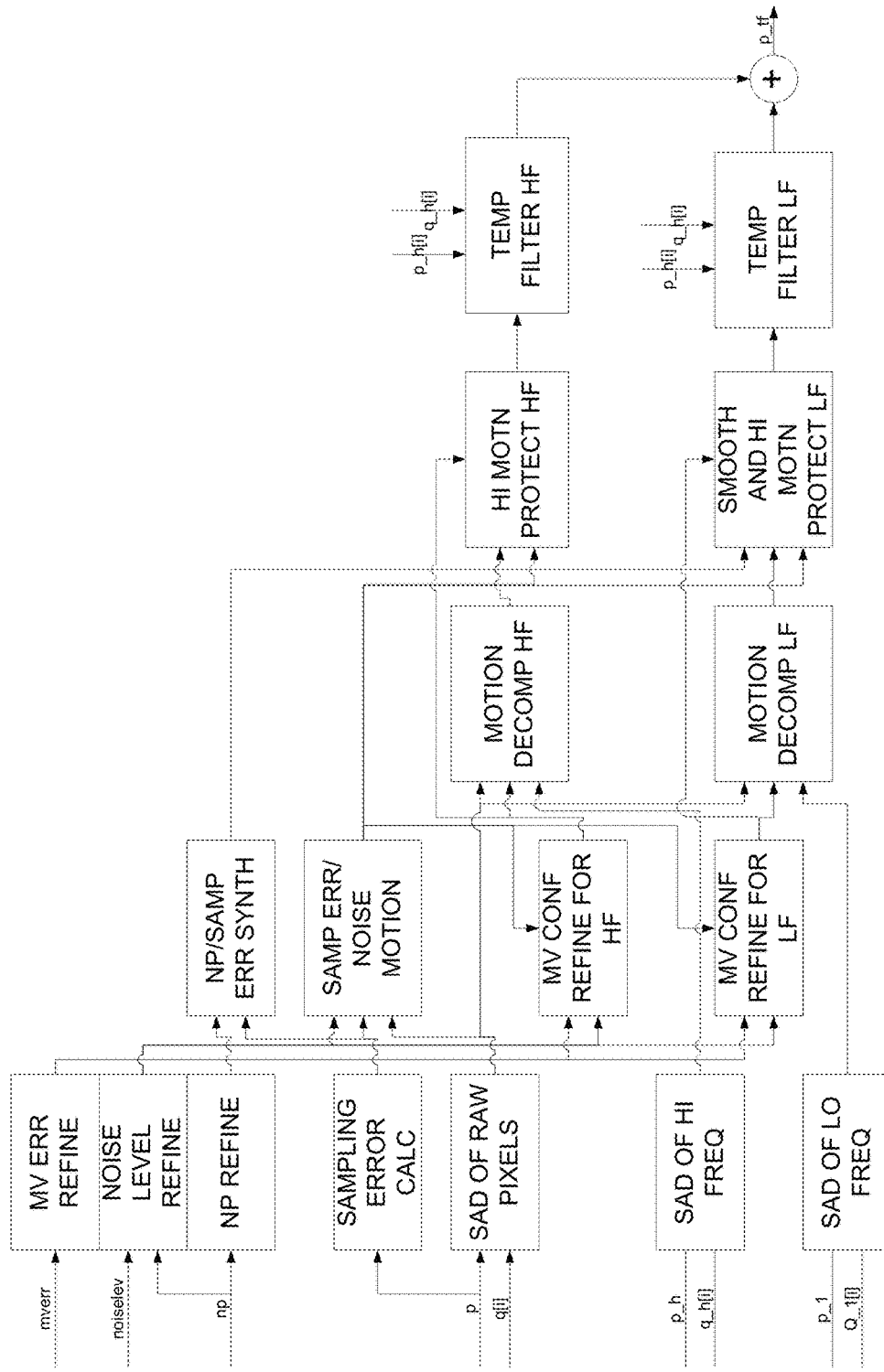
FIG. 18 shows an embodiment of adaptive channel temporal filtering.

As shown in FIG. 18, the motion vector confidence measure MVErr, block NP and block noise level are modified according to distance between center of the block corresponding to mv[i] and pixel p. Then sampling error of p which is used to evaluate how well matched using local data in the same image is and measure how many textures or details around current pixel are is calculated in 3×3 neighborhood of p. Next, the NP and sampling error are synthesized to get a new measurement to evaluate the texture strength around pixel p. The SAD of the raw data are calculated by using 3×3 p_n and q_n[i], and the SAD of the high frequency portions are calculated by using 3×3 p_h and q_h_n[i], and SAD of the low frequency portions are calculated by using 3×3 p_l and q_l_n[i]. The pixel motion error is calculated based on sampling error and noise level.

For the high frequency part, pixel motion error is refined based on the motion vector confidence, then the motion is decomposed for high frequency, then this motion is further refined in order to protect high motion, finally temporal filtering for this part is implemented.

For the low frequency part, pixel motion error is refined based on MV confidence and noise level, then the motion is decomposed for low frequency, then this motion is further refined in order to protect smooth or weak texture region and high motion, finally temporal filtering for this part is implemented. The process then synthesizes the results of sub-channel temporal filtering.

In the motion decomposition for both high frequency and low frequency, most of the logic is the same. The motion vector confidence based motion error refinement for high frequency, and noise and MV confidence based motion error refinement for low frequency are introduced in noise and MV confidence based pixel motion error refinement for the sub-channel discussion. Motion decomposition for the high frequency and the motion decomposition for low frequency are introduced in motion decomposition for the sub-channel. High motion protection for the high frequency and the smooth region and the high motion protection for low frequency are introduced in the smooth region and the high motion protection for the sub-channel discussion. Temporal filtering for high frequency and temporal filtering for low frequency are introduced in temporal filtering for sub-channel discussion. While only two channels are discussed, it should be obvious to one skilled in the art that the same concept could be applied to more than just two frequency bands or sub-channels.

Figure 19:
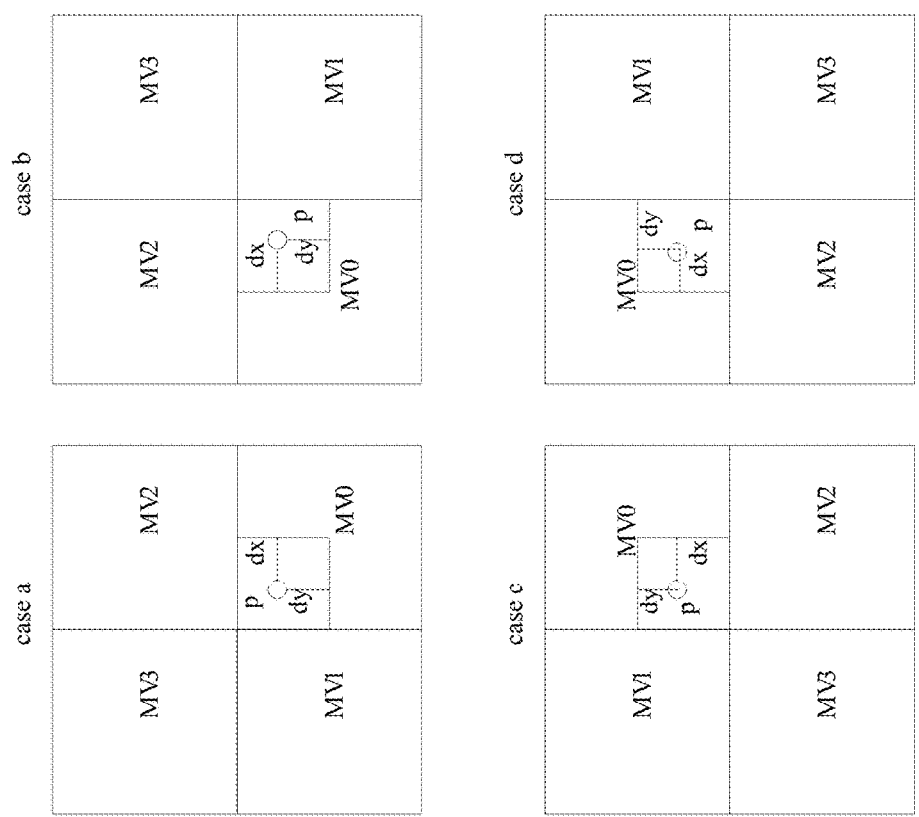
FIG. 19 shows four examples of a pixel position in a high resolution block.

FIG. 19 shows examples of the block locations for MVErr, noise level and NP refinement. For a pixel p in hr_1, it is in one sub-block (BLKSIZE/2*BLKSIZE/2) of a high resolution block (BLKSIZE*BLKSIZE) which it belongs to. There are 4 cases, in case a) p is in top left sub-block; in case b) p is in top right sub-block; in case c) p is in bottom left sub-block; and for case d) p is in bottom right sub-block. MV0 is the MV of the high resolution block to which p belongs In each case, four MVs (MV0, MV1, MV2, MV3) are selected for temporal filtering as they are shown in the figure of a framework of frequency channel temporal filtering. Here, dx and dy measure the horizontal and vertical distance between p and the center of the high resolution block that it belongs to respectively. The noise level BlkNoiseLev[i] corresponding to mv[i] is determined by classifying NP[i] into nearest class. It is equal to the noise level of this nearest class.

In order to make sure that the pixel level information smoothly varies, the block to pixel level refinement is done as follows. If mv[i] is MV0, then nRNP[i]=NP[0]; nRMVErr[i]=MVErr[0]; and nRNoiseLev[i]=BlkNoiseLev[0]. If mv[i] is MV1 then sx=BLKSIZE/2-dx; RNP[i]=(dx*NP[1]+sx*NP[0])/(BLKSIZE/2); nRMVErr[i]=max((dx*MVErr[1]+sx*MVErr[0])/(BLKSIZE/2), SADNP[1]); and nRNoiseLev[i]=(dx*BlkNoiseLev[1]+sx*BlkNoiseLev[0])/(BLKSIZE/2). If mv[i] is MV2 sy=BLKSIZE/2-dy; nRNP[i]=(dy*NP[2]+sy*NP[0])/(BLKSIZE/2); nRMVErr[i]= max((dy*MVErr[2]+sy*MVErr[0])/(BLKSIZE/2), MVErr[2]); and nRNoiseLev[i]=(dy*BlkNoiseLev[2]+sy*BlkNoiseLev[0])/(BLKSIZE/2). If mv[i] is MV3 then dxy=dx+dy; sxy=BLKSIZE-dxy; nRNP[i]=(dxy*NP[3]+sxy*NP[0])/BLKSIZE; nRMVErr[i]=max((dxy*MVErr[3]+sxy*MVErr[0])/BLKSIZE, MVErr[3]); and nRNoiseLev[i]=(dxy*BlkNoiseLev[3]+sxy*BlkNoiseLev[0])/BLKSIZE. Here, nRNP[i], nRMVErr[i], nRNoiseLev[i] are the refinements of NP, MVErr, and noise level respectively. Sampling error is used to evaluate how well matched using local data in the same image is and it also measures how many texture or details around the current pixel.

It is the SAD between neighborhood of current pixel and the half-pixel shift toward bottom right version s_n of this neighborhood. The half-pixel shifted pixel is calculated by using bilinear interpolation of 4 nearest int-pixels. It is calculated as follows:

$$nSampErr = \sum_{j=0}^{8} abs(p\_n[j] - s\_n[j]) * h[j]$$

Here, a 3×3 low pass filtering h={1, 2, 1; 2, 4, 2; 1, 2, 1}/16 is used to weight absolute difference between pixels.

If using 2-pixel spacing 3×3 window, sampling error is the SAD between neighborhood of current pixel and 1-pixel shifted toward bottom right version s_n of this neighborhood. FIG. 22 shows the relationship between p_n and s_n[i] for both small and big scaling ratios. For the small scaling ratio, the s_n pixels between the numbered pixels are generated by bilinear interpolation. In the large scaling ratio case, the s_n pixels are the already existing pixels.

To get the final sampling error, the nRNP[i] calculated above is combined with the per pixel sample error. For mv[i], the synthesized sampling error nLocalSampErr[i] is calculated as: nLocalSampErr[i]=max(LocalNPK*nRNP[i]/64, nSampErr). LocalNPK is a gain parameter to adjust nRNP.

The SAD calculation for raw pixels, high frequency and low frequency is calculated in a 3×3 window for each mv[i]. If the scaling ratio is bigger than 3, a larger window, such as 3×3 window with 2-pixel spacing is used. In the SAD calculation, a 3×3 low pass filtering h={1, 2, 1; 2, 4, 2; 1, 2, 1}/16 is used to weight absolute difference between pixels.

The SAD of raw pixels is found:

$$nSADRaw[i] = \sum_{j=0}^{8} abs(p\_n[j] q\_n[i][j]) * h[j]$$

The SAD of high frequency portions is found as:

$$nSADH[i] = \sum_{j=0}^{8} abs(p\_h\_n[j] - q\_h\_n[i][j]) * h[j]$$

The SAD of low frequency portions is found as:

$$nSADL[i] = \sum_{j=0}^{8} abs(p\_l\_n[j] - q\_l\_n[i][j]) * h[j]$$

FIG. 23 shows the relationship between p_n and q_n[i]. The pixel motion error is defined as the absolute difference between two corresponding pixels or the SAD between their corresponding neighborhoods pointed to by a motion vector. If the pixel motion error is bigger than 0, the motion vector is usually not accurate and strength of temporal filtering should be decreased. But some factors, such as sampling error, noise or match error, etc, can greatly influence pixel motion error. In principle, if noise-free SAD in a neighborhood is much less than noise-free sampling error, the MV is considered accurate and temporal filtering is appropriate. So, it is necessary to calculate pixel motion error based on sampling error and noise level.

For each mv[i], the basic process is as follows. First, subtract the noise component from the SAD nRSAD[i]=max (nSADRaw[i]−NoiseK_SAD*nRNoiseLev[i], 0). Here, NoiseK_SAD is a gain parameter to adjust nRNoiseLev for nSADRaw. Next, subtract the noise from the sampling error, nRSampErr[i]=max(nSampErr−NoiseK_SampErr*nRNoiseLev[i], 0). Here, NoiseK_SampErr is a gain parameter to adjust nRNoiseLev[i] for nSampErr.

Figure 24:
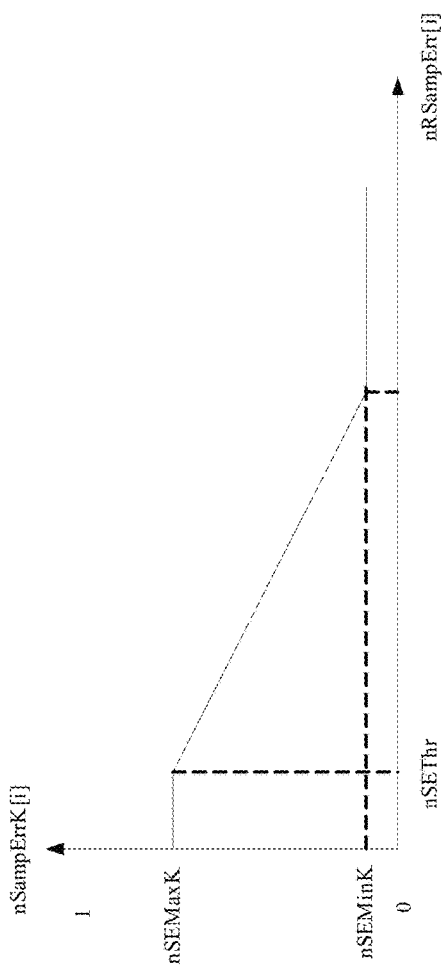
FIG. 24 shows a graphical representation of a calculation of a sampling error coefficient.

Pixel motion error calculation is performed as nPixMot[i]=max(nRSAD[i]−nSampErrK[i] *nRSampErr[i], 0). The coefficient nSampErrK[i] is calculated as shown in FIG. 24.

The pixel motion error should also take into account the motion vector confidence. If the confidence of the motion vector is high, then it is appropriate to decrease pixel motion error. Because high frequency and low frequency parts have different temporal instability, it is appropriate to handle them differently.

For example, mv[i] and the high frequency part, the weight nMVErrH[i] used for adjusting pixel motion error is nMVErrH[i]=max(MinMVErr, nRMVErr[i]). MinMVErr is a parameter to control MV confidence further. The smaller nMVErrH[i] is, the bigger the confidence of mv[i] is. For low frequency part, the weight nMVErrL[i] used for adjusting pixel motion error should be controlled by both noise level and motion vector confidence. If the noise level is larger, give pixel motion error a larger adjustment; otherwise, give it a smaller adjustment.

Figure 25:
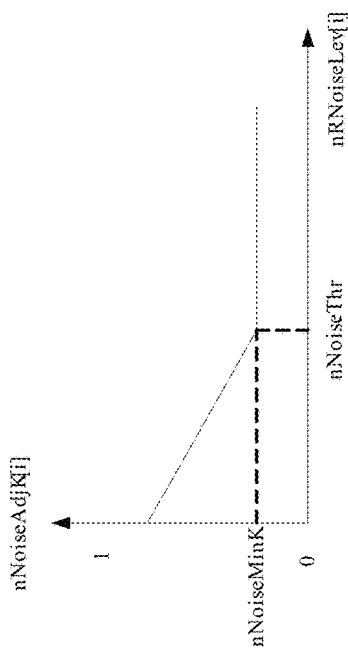
FIG. 25 shows a graphical representation of a weighting for a noise level.

The weight nNoiseAdjK[i] for motion adjustment based on noise level is as shown in FIG. 25. The process take two factors into consideration, the weight nMVErrL[i] is nMVErrL[i]=max(nNoiseAdjK[i], nRMVErr[i]). The smaller nMVErrL[i] is, the bigger the MV confidence is. The refined pixel motion error for high and low frequency channels are calculated as follows:

$$nRPixMotH[i]=nPixMot[i]*nMVErrH[i]$$

$$nRPixMotL[i]=nPixMot[i]*nMVErrL[i].$$

It is necessary to decompose the refined pixel motion error into two channels, one part for high frequency and the other for low frequency, in order to do temporal filtering in each channel. The proportion between sub-channel motion and pixel motion error is approximated by the ratio between SAD of this sub-channel and SAD of raw pixels. For mv[i], the sub-channel motion nMotH[i]/nMotL[i] is equal to its pixel motion error multiplied by the corresponding proportion as follows:

$$nHMot[i]=nRPixMotH[i]*\min(nSADH[i], nSADRaw[i])/\max(nSADRaw[i], 1);$$

$$nLMot[i]=nRPixMotL[i]*\min(nSADL[i], nSADRaw[i])/\max(nSADRaw[i], 1).$$

Figure 26:
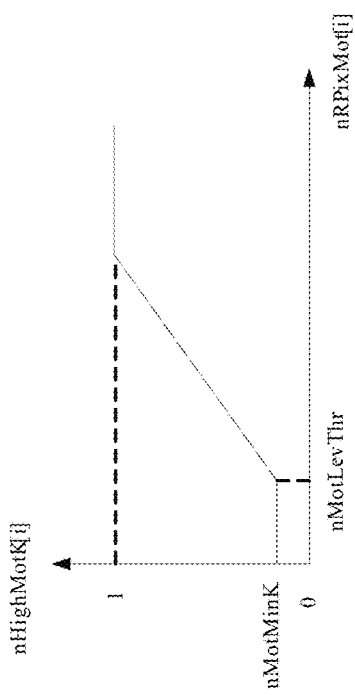
FIG. 26 shows a graphical representation of a weight for high motion protection.

If the refined pixel motion error is still big, it is appropriate to reduce temporal filtering for this pixel. In other words, the pixel motion error should not be decreased. So, the sub-channel motion should remain unchanged. The weight nHighMotK[i] of sub-channel motion adjustment for protecting high motion is calculated in FIG. 26. Different parameters can be used for different sub-channels. Two weights nHighMotKH [i] and nHighMotKL[i] are calculated for high and low frequency channels respectively for mv[i].

Figure 27:
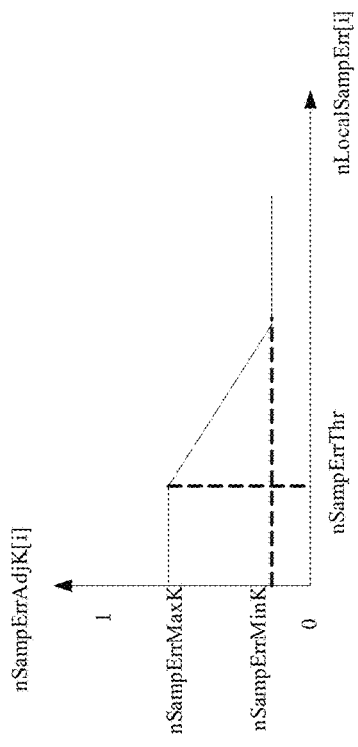
FIG. 27 shows a graphical representation of sub-channel motion adjustment for protecting smooth and weak texture.

As it is known, it is often hard to get accurate motion vectors for smooth regions and weak texture regions even though the SAD of the motion vector is small. Sometimes, an accurate motion vector doesn't exist in these regions due to complex motion, such as deformation, etc. It is better to protect these regions. In other word, the sub-channel motion error should be unchanged. Because the high frequency channel deals mostly with noise-like or slight flicker, this protection is not needed. This protection is only needed for the low frequency part. For mv[i], the texture and smoothness are measured by the refined sampling error nLocalSampErr[i]. The weight nSampErrAdjK[i] of sub-channel motion adjustment for protecting smooth and weak texture region is calculated in FIG. 27.

So, the output weight of this sub-block is based upon whether it is high frequency or low frequency part. For the high frequency part, the weight is nSmthHighMotKH[i]=nHighMotKH[i]. For the low frequency part, the process takes these two factors into consideration, the weight nSmthHighMotKL[i]=max(nHighMotKL[i], nSampErrAdjK[i]). The weight is sent to temporal filtering for sub-channel.

For a pixel p, the general method of temporal filtering in each channel for mv[i] is p_tf_x[i]=w*p_x+(1-w)*q_x[i]+(1-w)*f(p_x-q_x[i]). Here, x can be the high or low frequency channel and w is the blending weight. For FIR mode, w is equal to ½, for the IIR mode, w is less than ½, and it is set by users. The f is a function of the difference of two corresponding pixels pointed by the motion vector and varies between 0 and p_x-q_x[i].

If one were to let nChanDiffX[i]=p_x-q_x[i] and nChanSumX[i]=w*p_x+(1-w)*q_x[i]. The process then gets the final motion nFinalDiffX[i]=f(p_x-q_x[i]) as follows:

$$nRefDiffX[i]=\max(nXMot, \text{abs}(nChanDiffX[i])*nSmthHighMotKX[i]);$$

if (nChanDiffX[i]>0) nFinalDiffX[i]=min(nRefDiffX[i], nChanDiffX[i]); else $$nFinalDiffX[i]=\max(-nRefDiffX[i], nChanDiffX[i]).$$

Here, X can be H or L and nSmthHighMotKX[i] is a parameter that is adjusted to give the desired performance. Then temporal filtering in sub-channel is p_tf_x[i]=nChanSumX[i]+(1-w)*nFinalDiffX[i].

The temporal filtering result p_tf[i] for mv[i] is calculated by synthesizing the filtered results of low and high frequencies: p_tf[i]=p_tf_h[i]+p_tf_l[i]. Because p_tf[i] may be out of the range between p and q[i], it is necessary to limit it into this range. If p_tf[i]<min(p, q[i]), p_tf[i]=min(p, q[i]); else if p_tf[i]>max(p,q[i])=max(p, q[i]).

Figure 28:
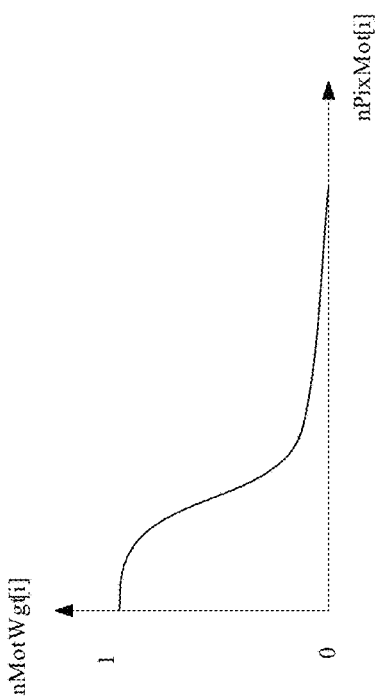
FIG. 28 shows a graphical representation of a weight for a pixel motion error.

After getting temporal filtering for each mv[i], i=0,1,2,3, it is necessary to blend their results based on pixel motion error and the pixel position in a high resolution block. The blending based on pixel position is necessary in order to reduce block artifacts between adjacent high resolution blocks The weight nMotWgt[i] is calculated according to the pixel motion error for mv[i] in FIG. 28. The position weight nPosWgt[i] is calculated according to the distance between pixel p and the center of the high resolution block where mv[i] resides. wx1=dx; wx0=BlkSIZE-dx; wy1=dy; wy0=BLKSIZE-dy; nPosWgt[0]=wy0*wx0; nPosWgt[1]=wy0*wx1; nPosWgt[2]=wy1*wx0; nPosWgt[3]=wy1*wx1.

The blending result p_ts of filtered pixels is $$p\_ts = \sum_{i=0}^{3} p\_tf[i]*nPosWgt[i]*nMotWgt[i] \bigg/ \sum_{k=0}^{3} nPosWgt[i]*nMotWgt[i]$$

Some motion vectors even with good SAD are not really right. When using them for temporal filtering, the resulting image becomes distorted or floating. Though spatial filtering brings blur, it cannot produce these artifacts like wrong motion vectors. Therefore, it is reasonable to constrain temporal filtering strength by appropriate spatial filtering and noise level. In principle, the temporal filtering strength can be larger than noise level, but should not exceed the strength of a strong spatial filtering that is almost noise-free. This is the sub-block named constraint by spatial filtering and noise level.

For a pixel p, its spatial filtering result simply comes from bilateral filtering. However, the weight of luma part should be adjusted further based on the detail level (nLocalSampErr). The rules are that in smooth or low texture regions, the filtered results should not be too blurry. In strong texture/edge regions, the filtering should be strong enough in order to remove temporal inconsistencies among adjacent frames. The weight about spatial distance is calculated as $$nWgtSpat=\exp(-(j_p-j_q)^2/\sigma^2)$$

The q is pixel in the neighborhood of p. The $j_p$ and $j_q$ are coordinates of p and q respectively.

The weight about luma distance is calculated as:

$$nWgtLuma=\max(\exp(-((f(p-q))^2/\tau^2), LumaMinWgt)$$

$$f(p-q)=\max(\text{abs}(p-q)-nRNoiseLev[0]-LumaDiffCoring,0)$$

Figure 29:
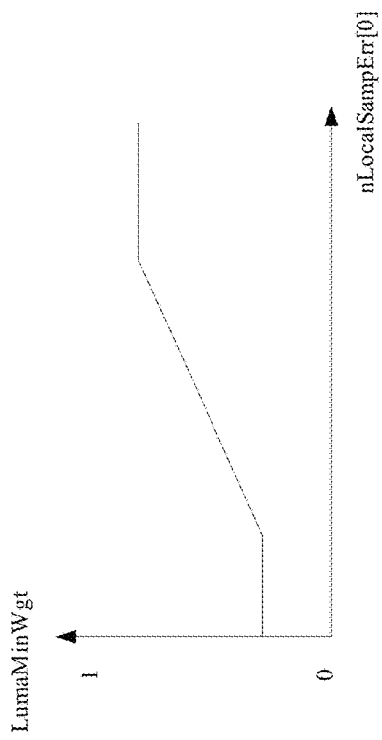
FIG. 29 shows graphical representation of two adaptive parameters for spatial filtering.

Tau is a parameter to control the luma weight.
The variables LunaMinWgt and LumaDiffCoring are calculated according to detail measurement nLocalSampErr[0] as shown in FIG. 29. With these two adaptive parameters, the spatial filtering is done and the result is p_sp.

The constraint process limits the change in the pixel due to temporal filtering by the magnitude of the change produced by the spatial filtering. This is accomplished as follows:

nDiffTprRaw=p_ts−p;

nDiffSptRaw=abs(p_sp−p);

nDiffConstr=max(nDiffSptRaw, nRNoiseLev[0]);

if(nDiffTprRaw>0) nDiffR=min(nDiffTprRaw, nDiffConstr);

else nDiffR=max(nDiffTprRaw, −nDiffConstr);

p_out=p+nDiffR. P_out is the final filtering result.

Figures 20, 21:
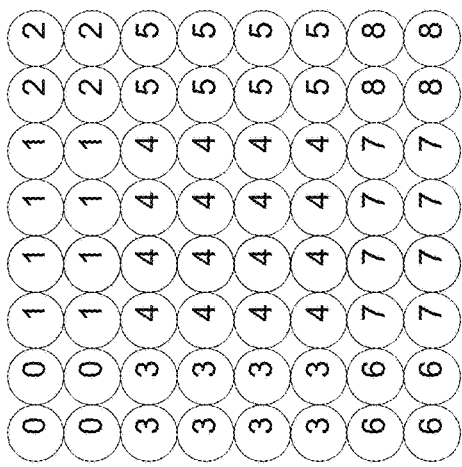
FIG. 20 shows an example of categories of pixels according to spatial distances.
FIG. 21 shows an example of neighborhoods of a current high resolution block with their motion vectors.

While the above produces very good results, it is possible to simplify the process in several areas. The first area that can be simplified is the number of motion vectors that are used to do the temporal filtering. As shown above, four motion vectors are used for temporal filtering; one from the current block and 3 from the 3 nearest neighbors. This is done to prevent block type artifacts. However, if the pixel is close to the center of a block, only the current block motion vector needs to be used. If the pixel is close to the midpoint of an edge, only two are required. Otherwise, the pixel is close to a corner of the block and all four motion vectors are required. Therefore the following simplification can be made:

For an 8×8 HR block, its pixels can be classified into 9 categories according to the spatial distances between them and central pixel. FIG. 20 shows the categories of the pixels. The motion vectors in a 3×3 neighborhood of current high resolution block are shown in FIG. 21.

A pixel can be filtered at most 4 motion vectors according to its categories as follows:
a) if it belongs to category 0, the used MVs are MV_a, MV_b, MV_d, MV_e;
b) if it belongs to category 1, the used MVs are MV_b, MV_e;
c) if it belongs to category 2, the used MVs are MV_b, MV_c, MV_e, MV_f;
d) if it belongs to category 3, the used MVs are MV_d, MV_e;
e) if it belongs to category 4, the used MV is only MV_e;
f) if it belongs to category 5, the used MVs are MV_e, MV_f;
g) if it belongs to category 6, the used MVs are MV_d, MV_e, MV_g, MV_h;
h) if it belongs to category 7, the used MVs are MV_e, MV_h;
i) if it belongs to category 8, the used MVs are MV_e, MV_f, MV_h, MV_i.

In order to filter a pixel, user defined weights are given to the used motion vectors based on the spatial distance between this pixel and the centers of the blocks to which the motion vectors belong and the number of motion vectors being used. These weights are used to replace the weights with respect to dx and dy for MVErr, noise level, NP refinements, the pixel motion error, and position based blending discussed in more detail above. For a 4×4 HR block, the weights can be calculated based on a similar idea.

Another simplification arises by noting that in the above generation of the pixel motion error for high and low frequency sub-channels, the SAD of the sub channels needs to be calculated. Because there are up to four motion vectors being used, that requires 4 bilateral filters which are expensive to implement. During the adaptive channel temporal filtering, for each mv[i], SAD of raw pixels, high frequency and low frequency in corresponding 3×3 windows need to be calculated, which are named nSADRaw[i], nSADH[i] and nSADL[i], and the ratios nSADH[i]/nSADRaw[i], named nHSADRatio[i], and nSADL[i]/nSADRaw[i], named nLSADRatio[i] are used to decompose motion.

Ideally, nSADRaw[i] is approximately equal to the sum of nSADL[i] and nSADH[i]. In other words, it is valid that nHSADRatio[i]+nLSADRatio[i]=1. If the ratio nHSADRatio[i] has statistical significance, it can be learned by training many high resolution images. From the experiments, the ratio nHSADRatio[i] is dependent on detail or texture strength nSampErr, and the bigger the sampling error is, the smaller nHSADRatio[i] is.

After getting the ratio nHSADRatio[i], the SADs of high and low frequencies nSADH[i], nSADL[i] can be easily calculated, and there is no bilateral filtering for motion decomposition. Therefore, the computational complexity is greatly decreased.

A function fu between nHSADRatio[i] and nSampErr is defined as nHSADRatio[i]=fu(nSampErr). The function fu can be implemented by a lookup table (LUT) through training many high resolution images. It is reasonable to assume that all mv[i]s share the same LUT. Therefore, the index is removed from nHSADRatio.

Figure 17:
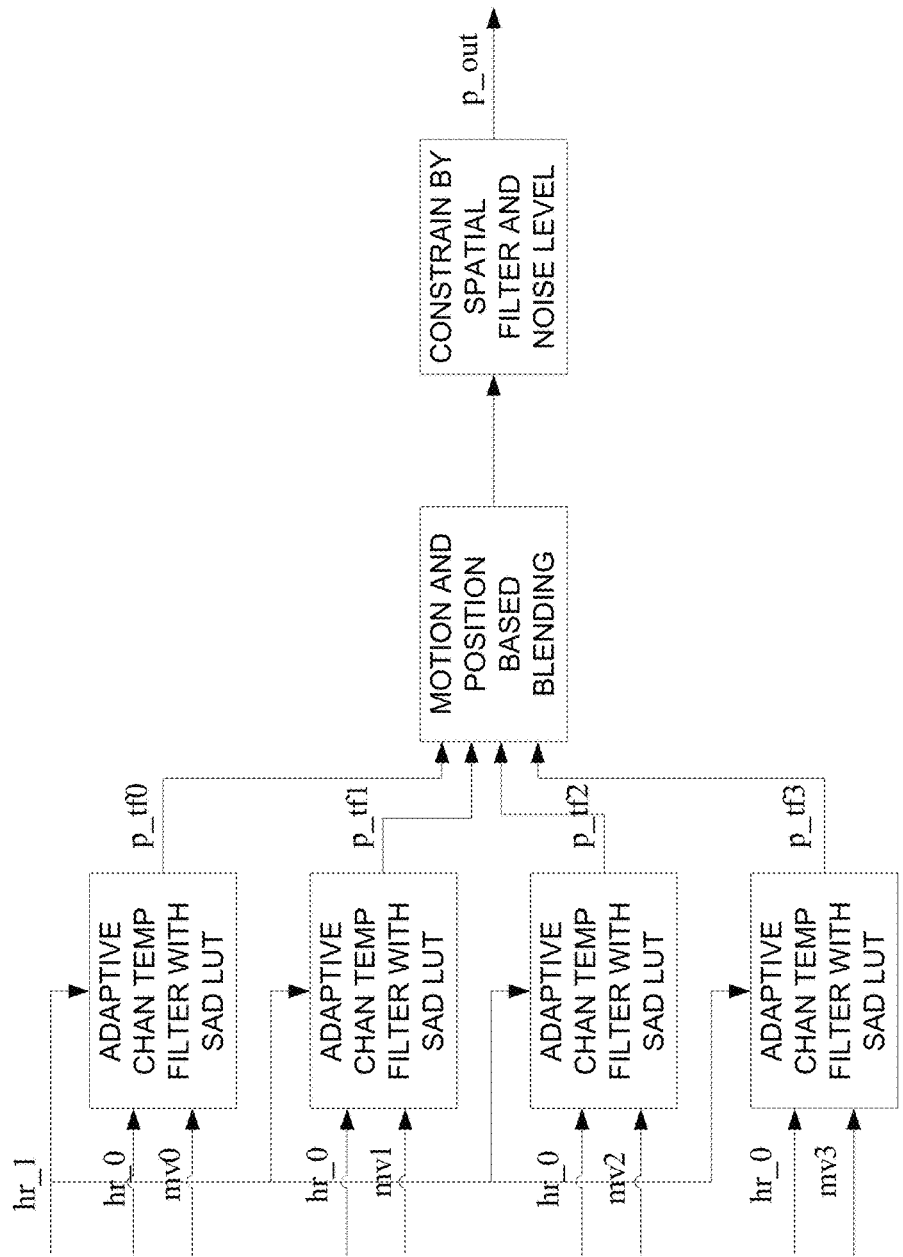
FIG. 17 shows an embodiment of a frequency channel temporal filtering with a trained SAD ratio LUT.

An embodiment of a frequency channel temporal filtering with a trained SAD ratio LUT is shown in FIG. 17. In this figure, motion and position based blending sub-block and constrain by spatial filtering and noise level sub-block are same as those in the original frequency channel temporal filtering, the adaptive channel temporal filtering with SAD ratio LUT sub-block has some difference with the original adaptive channel temporal filtering. It is obvious that there is no frequency channel decomposition by using bilateral filtering. Therefore, the computational complexity is greatly decreased.

Figure 30:
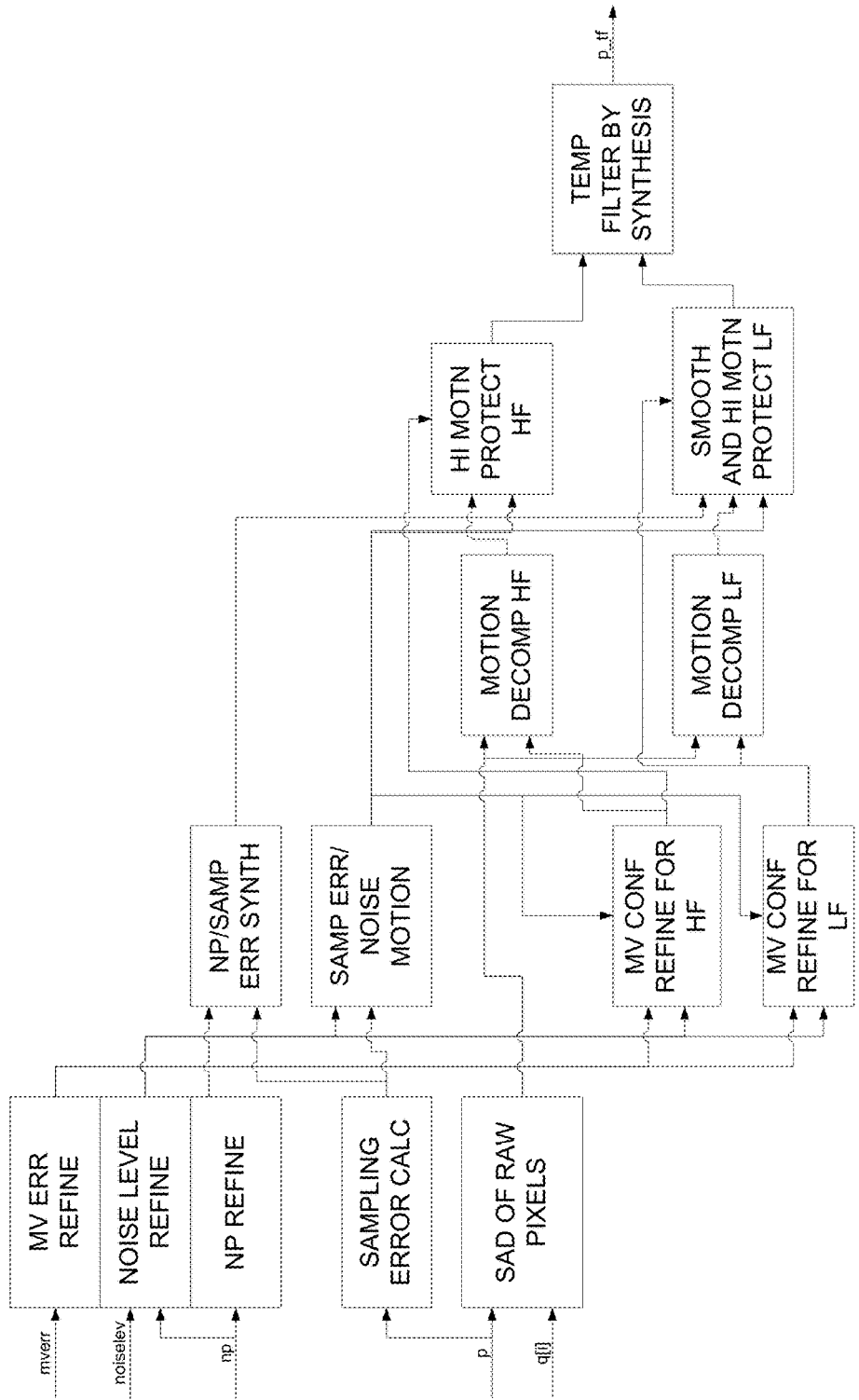
FIG. 30 shows a process of adaptive channel temporal filtering with a SAD ratio LUT.

FIG. 30 shows another embodiment of a flow of adaptive channel temporal filtering with SAD ratio LUT. In this embodiment calculating the SAD of high and low frequencies in 3×3 windows is removed. Therefore, there is no need for bilateral filtering. The sub-blocks with the same names as those in original adaptive channel temporal filtering are the same as the original ones. The motion decomposition for high/low frequency using the SAD ratio LUT sub-block has some difference with the original motion decomposition for high/low frequency sub-block. And the temporal filtering by synthesizing frequency motions is a new sub-block.

In original motion decomposition for sub-channel, for each mv[i], the sub-channel motion nMotH[i]/nMotL[i] is equal to its pixel motion multiplied by the corresponding proportion as follows:

nHMot[i]=nRPixMotH[i]*min(nSADH[i], nSADRaw[i])/max(nSADRaw[i], 1);

nLMot[i]=nRPixMotL[i]*min(nSADL[i], nSADRaw[i])/max(nSADRaw[i],

Because nSADH[i]/nSADRaw[i] is highly correlated with the sample error, it can be fetched from a SAD ratio LUT based on detail or texture level nSampErr. The retrieved ratio is named nHSADRatio. The sub-channel motion can be calculated as nHMot[i]=nRPixMotH[i]*nHSADRatio;

nLMot[i]=nRPixMotL[i]*(1−nHSADRatio).

After doing high motion protection for high frequency and smooth regions and high motion protection for low frequency, the temporal filtering is carried out by synthesizing frequency motions. Notice here, the pixel is not decomposed into high and low frequency parts, and only the motion error is decomposed into high and low frequency parts. It is different than the original temporal filtering for high/low frequency.

For a pixel p, the basic idea of temporal filtering for mv[i] is as p_tf[i]=w*p+(1−w)*q[i]+(1−w)*f(p−q[i]). The w is defined as that in the original temporal filtering for high/low frequency. The f is a function of the difference of two corresponding pixels pointed by the motion vector and varies between 0 and p−q[i]. Let nPixSum[i]=w*p+(1−w)*q[i], nPixDiff[i]=p−q[i], then one can estimate the pixel difference in the high and low frequencies (nChanDiffX[i]) that are used in the original temporal filtering approach as:

$$n\text{ChanDiff}H[i] = n\text{PixDiff}[i] * nH\text{SADRatio},$$

and $$n\text{ChanDiff}L[i] = n\text{PixDiff}[i] - n\text{ChanDiff}H[i].$$

Then one can get the final motion nFinalDiffX[i] for channel X as that in the original temporal filtering for high/low frequency. The synthesized motion f(p−q[i]) is the sum of nFinalDiffH[i] and nFinalDiffL[i]. So, the temporal filtering result p_tf[i] is equal to $$n\text{PixSum}[i] + (1-w)*(n\text{FinalDiff}H[i] + n\text{FinalDiff}L[i]).$$

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
    receiving, at a processor, a first frame of input image data from a series of input image data frames;
    dividing the first frame of input data into blocks of pixels;
    generating at least one motion vector field between the first frame of input image data and an adjacent frame of input image data, wherein the motion vector field has at least one motion vector for each block;
    refining the at least one motion vector field to provide refined motion vectors, wherein the refining is based upon a size of an initial motion vector for each block and characteristics of the image data in the block;
    temporally filtering the first frame of input image data using the refined motion vectors to produce a temporally filtered frame of image data; and
    generating a frame of interpolated image data using the temporally filtered frame of image data.

2. The method of claim 1, wherein refining the at least one motion vector field comprises refining motion vectors in the motion vector field using optical flow feature analysis.

3. The method of claim 2, wherein the motion vectors for the optical flow feature analysis are first refined using an integer pixel search that uses a step length based upon an initial motion vector size.

4. The method of claim 1, further comprising determining that an optical flow feature analysis is not appropriate for a particular block.

5. The method of claim 4, further comprising refining the at least one motion vector field is based upon pixel data in the block.

6. The method of claim 1, wherein temporally filtering the frame of image data further comprises separating pixel data into frequency bands.

7. The method of claim 6, wherein separating the pixel data into frequency bands comprises applying a filter to the pixel data.

8. The method of claim 7, wherein the filter comprises a bilateral filter.

9. The method of claim 1, wherein temporally filtering the frame of image data comprises filtering the frame of high resolution based upon motion errors in high and low frequency data.

10. The method of claim 9, wherein the motion errors comprise approximated total motion error and error measurement ratios.

11. The method of claim 1, wherein temporally filtering the frame of input image data comprises applying one of either a finite impulse response filter, or an infinite impulse response filter.

12. The method of claim 1, wherein temporally filtering the frame of input image data is constrained by a spatial noise reduction process.

13. The method of claim 1, wherein the refining uses a fast motion vector search having a step size determined by the size of the initial motion vector.

14. A method, comprising:
    receiving, at a processor, a first frame of input image data in a series of frames of input image data;
    generating at least one motion vector field between the first frame of input image data and an adjacent frame of input image data;
    refining the at least one motion vector field to provide refined motion vectors;
    temporally filtering the frame of input image data using the refined motion vectors to produce a temporally filtered frame of image data, wherein the input image data is divided into frequency bands prior to temporal filtering; and
    generating a frame of interpolated image data using the temporally filtered frame of image data.

* * * * *